INVENTOR:
NILS D. LEVIN,
ATTY.

Patented Aug. 10, 1948

2,446,708

UNITED STATES PATENT OFFICE 2,446,708

ELECTRIC MOTOR ARMATURE

Nils D. Levin, Columbus, Ohio, assignor to The Jeffrey Manufacturing Company, a corporation of Ohio Application February 6, 1946, Serial No. 645,919

9 Claims. (Cl. 171—252)

This invention relates to an electric motor armature or rotor.

An object of the invention is to provide an improved device of this type which is capable of operating at very high temperatures.

A further object of the invention is to provide an electric motor rotor or armature which eliminates all or at least part of the soldered connections between the coil ends or leads and the commutator and preferably also eliminates the soldered bands which have heretofore been used in many rotors and armatures to hold the coil sides in the rotor or armature slots.

A further object of the invention is to provide a rotor or armature with improved slot strips made of glass.

Still another object of the invention is to provide an improved armature or rotor in which a bracket or guard is provided which hooks over or overlaps the loop ends of the armature coils which extend beyond the coil slots and holds the loop ends against outward movement under the influence of centrifugal force.

Still another object of the invention is to provide a direct current armature in which the coils are connected to the commutator bars by both short or straight and long or bent back leads and in which the short leads are peripherally outside the long leads and all of which are preferably brazed to the commutator bars, the short leads thus acting to hold the long leads in place against centrifugal force.

Other objects of the invention will appear hereinafter, the novel features and combinations being set forth in the appended claims.

In the accompanying drawings.

In connection with the development of electric motors, such as direct current motors, a limiting factor which determines the rating of said motors has been the temperature of the armatures, because of the tendency for solder, which is frequently employed to connect the coil leads or ends to the commutator bars, to melt and be thrown off by centrifugal force, thus loosening or breaking the connection between these parts.

Furthermore, in many motors, both direct and alternating current, circumferential bands are also employed to hold the coil sides in the rotor or armature slots and these bands are frequently connected together by solder which is melted under high temperatures, thus destroying the band structure.

The improved armature or rotor which I have provided eliminates entirely the use of solder and in the most complete embodiment of the invention it eliminates solder not only from the connection between the coil ends or leads and the commutator bars, but also eliminates entirely the armature or rotor bands heretofore often employed to hold the coil sides in the rotor or armature slots.

I also preferably provide supplemental means for holding the loop ends of the coils against centrifugal force which tends to throw them radially outwardly.

Figure 1:
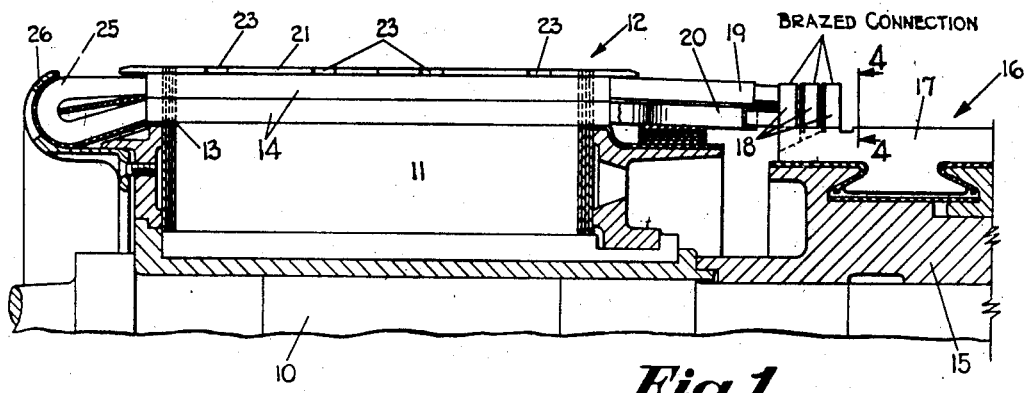
Fig. 1 is a sectional view through the axis of a motor armature or rotor constituting my invention.

As seen best in Fig. 1 of the drawings, the armature or rotor includes a rotor or armature shaft 10 upon which the main body 11 of a rotor or armature 12 is mounted. The body 11 is preferably formed of laminated silicon steel discs held together between protecting end plates in a manner well understood in the art. The face of the body 11 is provided with spaced axial grooves or slots 13 which receive the coil sides 14 of the coils which constitute the armature windings.

Mounted on a casting 15 which forms in effect a part of the body 11 there is the usual commutator 16, found on a direct current armature, which is built up of a plurality of spaced-apart insulated commutator bars 17. The commutator 16 is essentially of standard construction except for the following special features.

Figure 3:
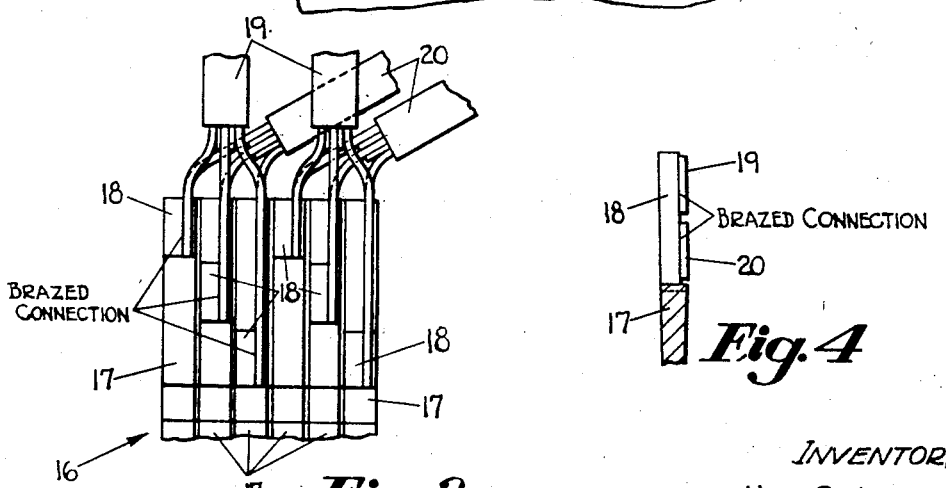
Fig. 3 is a developed plan view of a segment of the commutator showing particularly the connection between the commutator risers and the coil ends or leads.
Figure 4:
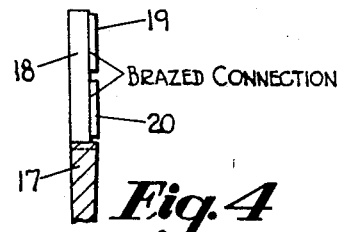
Fig. 4 is an enlarged sectional elevational view taken on the line 4—4 of Fig. 1, looking in the direction of the arrows, showing one of the commutator bars with its riser and connection to a pair of coil ends or leads.

The risers or connectors 18 of successive commutator bars 17 are axially offset, as clearly illustrated in Fig. 3 of the drawings. As illustrated in said Fig. 3, there are three steps created by successive risers 18, but under certain conditions there may be only two steps employed. As is customary in an armature the coil leads or coil ends adjacent the commutator side are connected to the risers 18 of the commutator bars 17. The windings are preferably so formed as to produce both short or straight leads or coil ends 19 and long or bent back leads or coil ends 20, and each riser 18 has both a long and a short lead or coil end attached to it.

Heretofore it has generally been the practice to place the long lead or coil end peripherally outside the short lead or coil end and generally a soldered band has been placed on the outside of the bundle of coil leads or ends to resist centrifugal forces. I prefer, however, to place the short leads or coil ends peripherally outside the long leads or coil ends and to eliminate the band at this position, relying upon the short leads 19 and their connections to the risers 18 to resist the centrifugal force. In certain broader aspects of my invention it is to be understood that this feature need not be employed.

It has been a common practice to connect the leads or coil ends 19 and 20 to the risers 18 by soldering, but this has been a limiting factor in operation of electric motors because as temperature increases it tends to reach a point at which the solder melts and is thrown off the armature by centrifugal action. In some instances where a very high point of melting solder is employed which has a melting point of approximately 500° F., it is evident that the operating temperature of the motor may be increased, but such solder has the disadvantage that it is very hard to apply and generally involves the use of a torch which heats an appreciable part of the commutator bars and as a consequence they lose their temper and hardness, causing the commutator bars to wear rapidly in operation.

One feature of my invention is that the leads or coil ends 19 and 20 are connected to the risers 18 by a brazed connection which involves temperatures of the order of 1400° F., which is obviously far above the operating temperature of a motor since insulation generally would not withstand temperatures anywhere approaching these.

Furthermore, the leads 19 and 20 are preferably attached to the risers 18 by a brazing operation which localizes the heat and confines it to the areas of brazing connection between said leads 19 and 20 and said risers 18, thus in no wise deleteriously affecting the temper of the commutator bars 17.

One manner of effecting this localized and concentrated brazing is to clamp a block of carbon on each side of the joint which is to be formed; that is, one block on the riser 18, the other on one or more of the leads 19 and 20, and pass a high amperage electric current through it for a very short period of time. If desired, the carbon blocks may be held by a tool similar to pinchers or pliers, the tongs of which are insulated one from the other as well as from the operating handle. The short flow of high amperage current will heat the adjacent surfaces of the risers 18 and leads 19 and 20, which are preferably previously provided with a brazing flux; and the high temperature will be localized adjacent these contacting surfaces, thus effecting a brazing connection between them and preventing high temperatures reaching other parts of the commutator or windings. The brazed connections provided also have high mechanical strength and this is particularly desirable in connection with the short leads or coil ends 19 since this mechanical strength is employed as at least a portion of the means to hold the coil ends 19 as well as the coil ends 20 in position against the centrifugal force developed during rotation of the rotor or armature 12.

Figure 2:
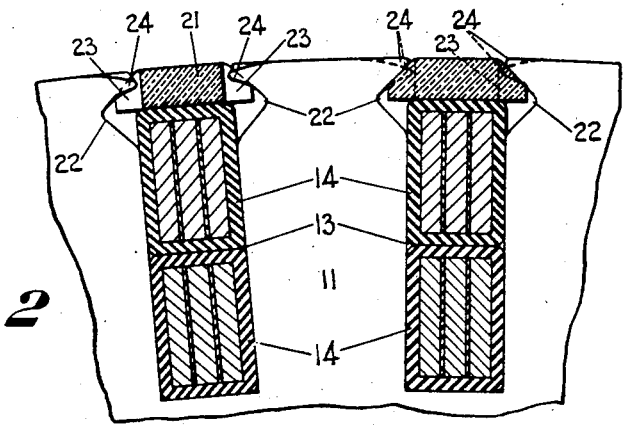
Fig. 2 is an enlarged view, with parts in section, taken right angles to the view of Fig. 1.

Another feature of my invention is the elimination of the clamping bands which hold the coil sides 14 in the slots 13 and in this regard I provide slot sticks or strips 21 in the tops of the slots 13 which are in the form of laminated strips having polygonal cross-sections, opposite sloping outward tapering edges of which are received by overlapping bearing surfaces provided in the tops of grooves or slots 13 by opposite V notches 22 adjacent said slot tops, which are clearly illustrated in Fig. 2 of the drawings.

Spaced along their lengths the sticks or strips 21 are also preferably provided with notches 23 on opposite sides thereof which are adapted to receive projections 24 formed on one or more of the laminated sheets of the body 11 and some of which projections 24 are peened into said strip notches 23 and lock the strips 21 against axial or longitudinal movement.

A feature of my invention is that these strips or sticks 21 are preferably made of glass. It has been found that glass makes a very desirable strip or stick, particularly relatively flexible glass which has been heretofore used for insulating purposes, since it has very high dielectric qualities as well as great physical strength.

As is well known, a coil, when placed on an armature body, forms coil loops at the end opposite the commutator in a direct current type of machine, and in an alternating current type of machine generally forms loops at both ends. To take some of the centrifugal load off the strips 21 and also to prevent undesired bending of the loop ends 25 of the coil under the influence of centrifugal force I provide a metal or plastic guard or bracket 26 which is preferably in the form of a ring-shaped hook which extends over the axially outward edges of the loop ends 25 and hooks around said loop ends so that it overlies the outer peripheries of said loop ends. The guard or bracket 26 is preferably removably connected to the end plate of the main rotor by screws or the like and becomes in effect a removable part of the body 11.

From the above description it is evident that the entire rotor or armature structure is one which has eliminated the use of solder in the making of commutator and coil connections as well as having eliminated armature bands which were generally heretofore employed and used solder. At the same time an extremely rugged and simplified construction has been provided.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A high temperature motor rotor including a body, coil slots in said body, a commutator on said body, coils mounted on said body in said slots with looped coil ends extending beyond said slots at one side, the coil ends on the other side being connected to said commutator by brazed connections, bracket means carried by said body extending around the looped coil ends and over the peripheries thereof to hold them against centrifugal force when said rotor rotates, and glass coil slot sticks in said slots on top of and holding the coils therein.

2. A high temperature motor rotor including a body, coil slots in said body, coils mounted on said body in said slots with looped coil ends extending beyond said slots at one side, bracket means carried by said body extending around the looped coil ends and over the peripheries thereof to hold them against centrifugal force when said rotor rotates, and glass coil slot sticks in said slots on top of and holding the coils therein.

3. A high temperature motor rotor including a body, coil slots in said body, a commutator on said body, coils mounted on said body in said slots with looped coil ends extending beyond said slots at one side, the coil ends on the other side being connected to said commutator by brazed connections, bracket means carried by said body extending around the looped coil ends and over the peripheries thereof to hold them against centrifugal force when said rotor rotates, and glass coil slot sticks in said slots on top of and holding the coils therein, the coil ends adjacent said commutator including long and short leads, the short leads being on top of the long leads.

4. A high temperature motor rotor including a body, coil slots in said body, a commutator on said body, coils mounted on said body in said slots with looped coil ends extending beyond said slots at one side, the coil ends on the other side being connected to said commutator by brazed connections, and glass coil slot sticks in said slots on top of and holding the coils therein, the coil ends adjacent said commutator including long and short leads, the short leads being on top of the long leads.

5. A high temperature motor rotor including a body, coil slots in said body, a commutator on said body, coils mounted on said body in said slots with looped coil ends extending beyond said slots at one side, the coil ends on the other side being connected to said commutator by brazed connections, and bracket means carried by said body extending around the looped coil ends and over the peripheries thereof to hold them against centrifugal force when said rotor rotates, the coil ends adjacent said commutator including long and short leads, the short leads being on top of the long leads.

6. A high temperature motor rotor including a body, coil slots in said body, a commutator on said body, and coils mounted on said body in said slots with looped coil ends extending beyond said slots at one side, the coil ends on the other side being connected to said commutator by brazed connections, the coil ends adjacent said commutator including long and short leads, the short leads being on top of the long leads.

7. A rotor including a body, coil slots in said body, coils having sides in said slots and loop ends extending axially beyond said body at one end, glass coil slot sticks in the tops of said slots keyed to said body and holding said coil sides in said slots, and guard means which hook over the loop ends of said coils and hold them in place.

8. An armature including a body, slots in said body, coils on said body having coil sides in said slots, a commutator on said body, said coils having long and short leads extending from the coil sides to said commutator, the short leads being peripherally outside the long leads to hold said long leads against radial movement when said armature rotates, and brazed connections between said short leads and said commutator.

9. An armature including a body, slots in said body, coils on said body having coil sides in said slots, and a commutator on said body, said coils having long and short leads extending from the coil sides to said commutator, the short leads being peripherally outside the long leads to hold said long leads against radial movement when said armature rotates.

NILS D. LEVIN.

REFERENCES CITED

The following references are of record in the file of this patent:

UNITED STATES PATENTS

| Number | Name | Date |
| --- | --- | --- |
| 680,795 | Mallett | Aug. 20, 1901 |
| 1,358,691 | Allen | Nov. 16, 1920 |
| 1,802,110 | Graham | Apr. 21, 1931 |
| 2,387,885 | Davis | Oct. 30, 1945 |